United States Patent
Takahashi

(10) Patent No.: US 9,317,938 B2
(45) Date of Patent: Apr. 19, 2016

(54) IMAGE PROCESSING APPARATUS AND CONTROL METHOD THEREFOR

(71) Applicant: CANON KABUSHIKI KAISHA, Tokyo (JP)

(72) Inventor: Kosei Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 303 days.

(21) Appl. No.: 13/870,932

(22) Filed: Apr. 25, 2013

(65) Prior Publication Data

US 2013/0328900 A1     Dec. 12, 2013

(30) Foreign Application Priority Data

Jun. 11, 2012  (JP) .................................. 2012-132368

(51) Int. Cl.
G06T 11/00      (2006.01)

(52) U.S. Cl.
CPC .................................... *G06T 11/001* (2013.01)

(58) Field of Classification Search
CPC .............................. G06T 15/04; G06T 11/001
See application file for complete search history.

(56) References Cited

U.S. PATENT DOCUMENTS

| 6,987,567 | B2 | 1/2006 | Takahashi et al. | |
| 7,149,368 | B2 * | 12/2006 | Tong et al. | 382/285 |
| 7,433,102 | B2 | 10/2008 | Takahashi et al. | |
| 7,443,536 | B2 | 10/2008 | Takahashi | |
| 7,616,361 | B2 | 11/2009 | Takahashi | |
| 7,667,845 | B2 | 2/2010 | Takahashi et al. | |
| 8,477,378 | B2 | 7/2013 | Edamura et al. | |
| 2008/0158239 | A1 * | 7/2008 | Lamy et al. | 345/581 |
| 2012/0230549 | A1 | 9/2012 | Takahashi | |

FOREIGN PATENT DOCUMENTS

| JP | 2007-140820 A | 6/2007 |
| JP | 2007-219715 A | 8/2007 |

* cited by examiner

*Primary Examiner* — Antonio A Caschera

(74) *Attorney, Agent, or Firm* — Fitzpatrick, Cella, Harper & Scinto

(57) ABSTRACT

A bidirectional texture function image as a bidirectional reflectance distribution function for each pixel of a target object is input. An average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data are stored in a storage apparatus as information indicating the bidirectional reflectance distribution function for each pixel.

10 Claims, 7 Drawing Sheets

IMAGE PROCESSING APPARATUS AND CONTROL METHOD THEREFOR

BACKGROUND OF THE INVENTION

1. Field of the Invention

The present invention relates to a technique of acquiring/reproducing the reflection characteristics of an object and, more particularly to a gonio characteristic reproduction technique of acquiring/holding/reproducing the local gonio reflection characteristics of an object.

2. Description of the Related Art

Along with recent development of CG (Computer Graphics) techniques, it has become possible to generate a CG image with almost the same quality as that of an actually captured image. CG images are used in a wide range of fields including not only movie and game industries but also product design and commercial photos.

There is conventionally known a method of using BRDF (Bidirectional Reflectance Distribution Function) data of an object to generate a CG image. This method is implemented by a technique of generating BRDF data of an object using a mathematical model in addition to a technique of actually measuring the BRDF characteristics of a subject and generating BRDF data using actual measurement values.

There is also known a technique of using, as input data, a BTF (Bidirectional Texture Function) indicating the distribution of small BRDFs on an object surface to be rendered, in order to improve the reality of a CG image to be generated. This technique also allows reproduction of the texture of a rendering object.

As represented in a geometric form shown in FIG. 4, however, BTF data is data storing reflectances for the zenith angle (Sin) and azimuth 4 in) of incident light and the zenith angle (Bout) and azimuth (Out) of exit light. Therefore, the amount of data is enormous, and it is thus necessary to compress the data amount to enable processing at practical cost.

In Japanese Patent Laid-Open No. 2007-219715, for example, the amount of BTF data is reduced by measuring BTF data of a subject and that of a white plate, and then approximating the BRDF of each pixel by a cosine function. Furthermore, in Japanese Patent Laid-Open No. 2007-140820, a table R(u, v) indicating reflection characteristics of a BTF is defined for each combination of four angles θL, φL, θV, and φV. Some of all the pixels are set as representative pixels, and the remaining pixels are set as general pixels. Contents of the table R(u, v) are used intact for the representative pixels. For each representative pixel, rows and columns associated with φL, and φV of the table R(u, v) undergo rotation/shift to derive a plurality of variations of the table, and a derived table that approximates the BTF data of the pixel best is substituted for its table R(u, v), thereby reducing the amount of BTF data.

If, however, there is minute unevenness on the surface of a subject, the normal to each pixel varies from the macroscopic normal to a specimen plane. If the receiving angle is changed, an angle at which a highest intensity is obtained is different for each pixel. The technique described in Japanese Patent Laid-Open No. 2007-219715 simply approximates the BTF data of each pixel by the cosine function, thereby disabling to correctly reproduce a shift of the peak position of each pixel.

The technique described in Japanese Patent Laid-Open No. 2007-140820 considers a shift of a peak position and performs rotation/shift to derive a plurality of variations of the table for each representative pixel, thereby performing approximation. It is, however, difficult to approximate a BTF image of a subject with high accuracy.

The present invention provides a technique of readily measuring a BTF, and generating high precision BTF data using a small amount of data, in order to perform CG rendering at practical calculation cost.

SUMMARY OF THE INVENTION

To achieve the above object, an image processing apparatus has the following arrangement.

That is, an image processing apparatus comprising: an input unit configured to input a bidirectional texture function image as a bidirectional reflectance distribution function for each pixel of a target object; and a storage control unit configured to store, in a storage apparatus, as information indicating the bidirectional reflectance distribution function for each pixel, an average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

First Embodiment

Figure 1:
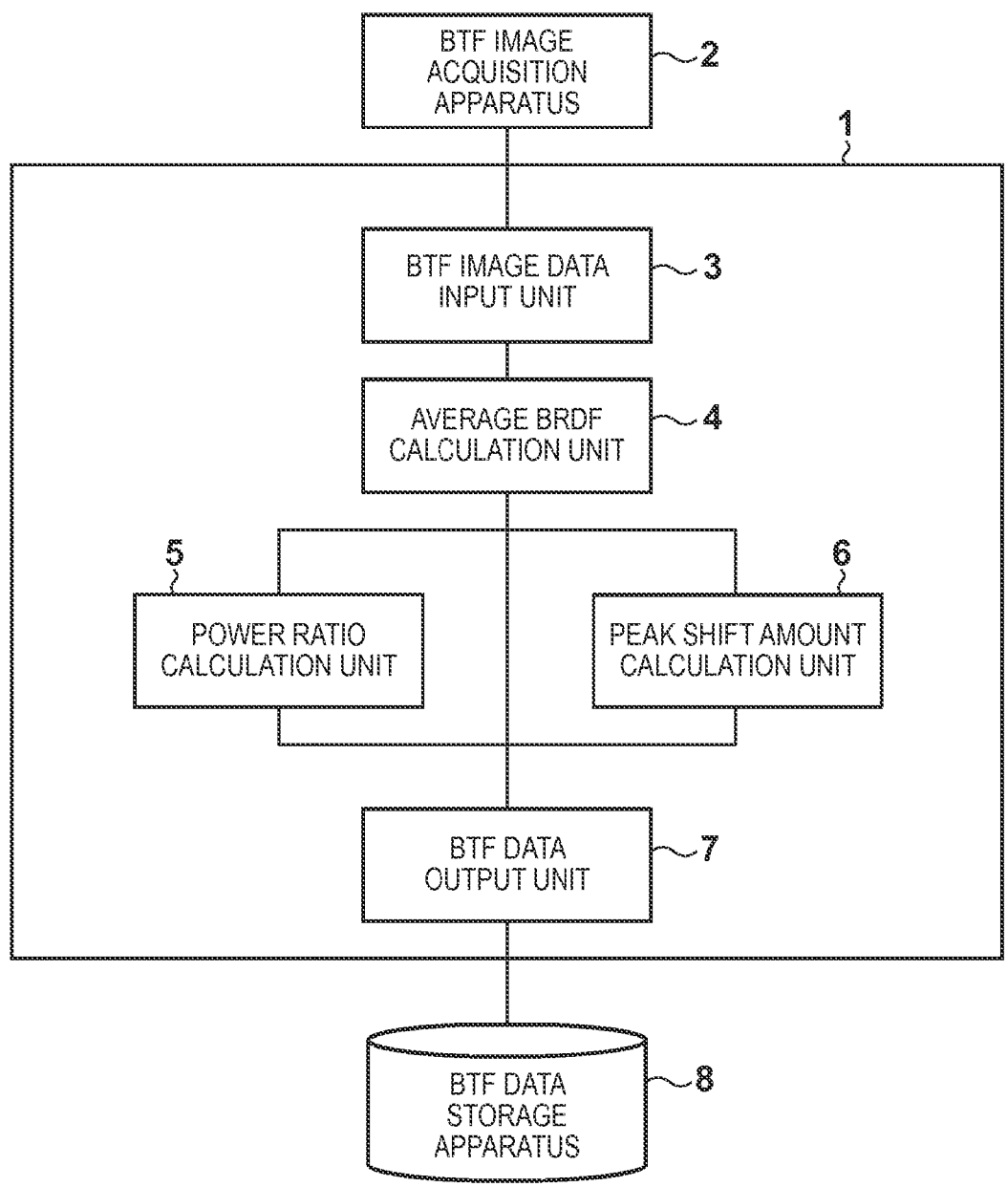
FIG. 1 is a block diagram showing the arrangement of an image processing apparatus according to the first embodiment.

The arrangement of an image processing apparatus according to the first embodiment will be explained with reference to a block diagram shown in FIG. 1.

Reference numeral 1 denotes an image processing apparatus for compressing and storing BTF data; 2, a BTF image acquisition apparatus for acquiring a BTF image of a target object for which BTF data is measured; 3, a BTF image data input unit for loading BTF image data acquired by the BTF image acquisition apparatus 2 into the image processing apparatus 1; and 4, an average BRDF calculation unit for calculating an average BRDF (BRDF average value) of all the pixels of the BTF image data input by the BTF image data input unit 3 or pixels within a region designated in advance. The average BRDF calculation unit 4 is an average bidirectional reflectance distribution function calculation unit for calculating an average bidirectional reflectance distribution function (BRDF) for bidirectional texture function image data (BTF image data).

Reference numeral 5 denotes a power ratio calculation unit for calculating, for each pixel of the BTF image, a power ratio to the average BRDF calculated by the average BRDF calculation unit 4; 6, a peak shift amount calculation unit for calculating, for each pixel of the BTF image, a peak shift amount with respect to the average BRDF calculated by the average BRDF calculation unit 4; 7, a BTF data output unit for outputting, as BTF data, the average BRDF calculated by the average BRDF calculation unit, the power ratio of each pixel calculated by the power ratio calculation unit 5, and the peak shift amount of each pixel calculated by the peak shift amount calculation unit 6; and 8, a BTF data storage apparatus for storing the BTF data output from the BTF data output unit 7.

Figure 5:
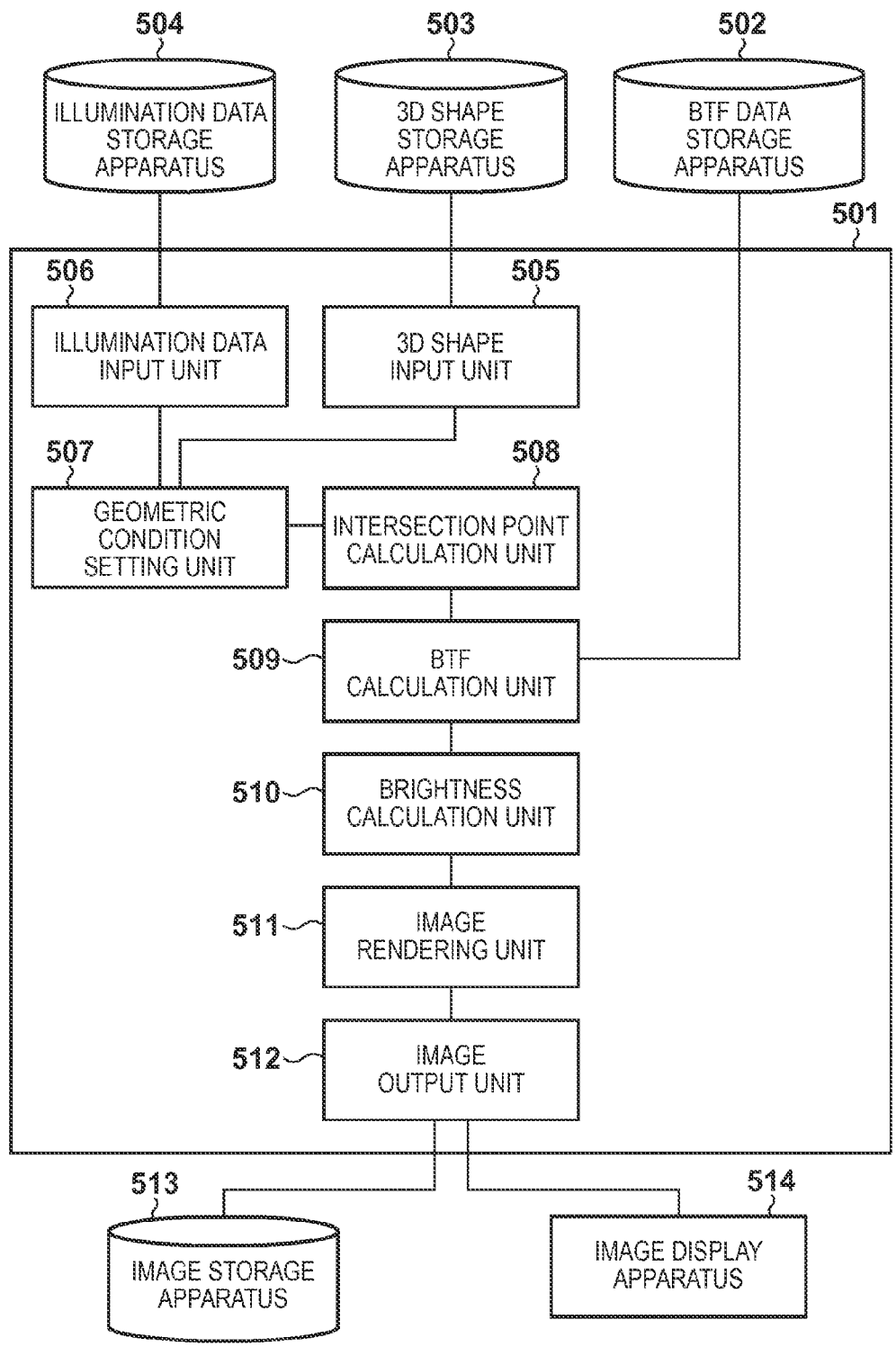
FIG. 5 is a block diagram showing the arrangement of an image processing apparatus according to the second embodiment.

Note that the image processing apparatus shown in FIG. 1 or 5 (to be described later) includes standard components (for example, a CPU, a RAM, a ROM, a hard disk, an external storage apparatus, a network interface, a display, a keyboard, a mouse, and the like) mounted on a general-purpose computer. The various components of the image processing apparatus shown in FIG. 1 may be implemented by programs operating under the control of the CPU or by dedicated hardware components. Constants and variables used by the control operation of the CPU are stored in a memory or hard disk and processed, as needed.

Figure 2:
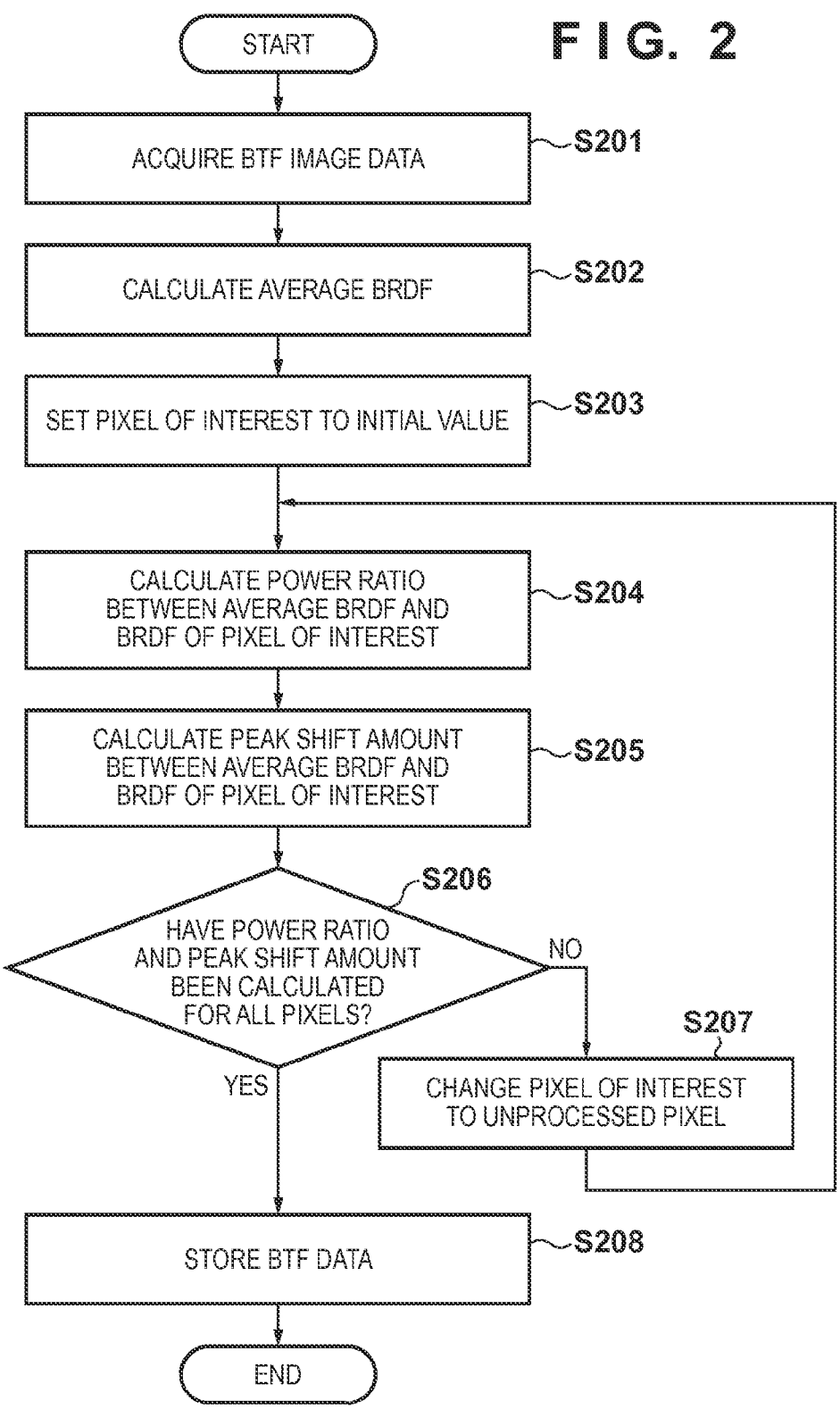
FIG. 2 is a flowchart illustrating processing by the image processing apparatus according to the first embodiment.

FIG. 2 is a flowchart illustrating image processing according to the first embodiment.

In step S201, the BTF image acquisition apparatus 2 performs image capturing (gonio image capturing) while changing the angle (incident angle) of an illumination unit (light source) and the camera angle (receiving angle) of a camera serving as an image capture apparatus with respect to a target object (subject). BTF image data as BRDF data for each pixel is thus obtained. After that, the BTF image data input unit 3 loads the BTF data into the image processing apparatus 1. In step S202, the average BRDF calculation unit 4 calculates an average BRDF of all the pixels of the BTF image data loaded in step S201 or pixels within a region designated in advance (details thereof will be described later).

In step S203, the image processing apparatus 1 sets a pixel of interest to an initial value, for example, the upper left point of the BTF image data to calculate a power ratio and peak shift amount for each pixel. In step S204, the power ratio calculation unit 5 calculates the power ratio between the average BRDF calculated in step S202 and the BRDF of the pixel of interest (details thereof will be described later). In step S205, the peak shift amount calculation unit 6 calculates the peak shift amount between the average BRDF calculated in step S202 and the BRDF of the pixel of interest (details thereof will be described later).

In step S206, the image processing apparatus 1 determines whether calculation of the power ratio in step S204 and calculation of the peak shift amount in step S205 have been performed for all the pixels as targets. If the calculation operations have not been performed for all the pixels (NO in step S206), that is, there is an unprocessed pixel, the process advances to step S207. In step S207, the image processing apparatus 1 changes the pixel of interest to one of the unprocessed pixels, and the process returns to step S204.

On the other hand, if the calculation operations have been performed for all the pixels (YES in step S206), the process advances to step S208. In step S208, the BTF data output unit 7 is outputs, as BTF data, the average BRDF calculated in step S202, the power ratio of each pixel calculated in step S204, and the peak shift amount of each pixel calculated in step S205. The output BTF data is stored in the BTF data storage apparatus 8.

<Calculation of Average BRDF>

A method of calculating the average BRDF (BRDF average value) in step S202 will be described in detail.

Figure 3:
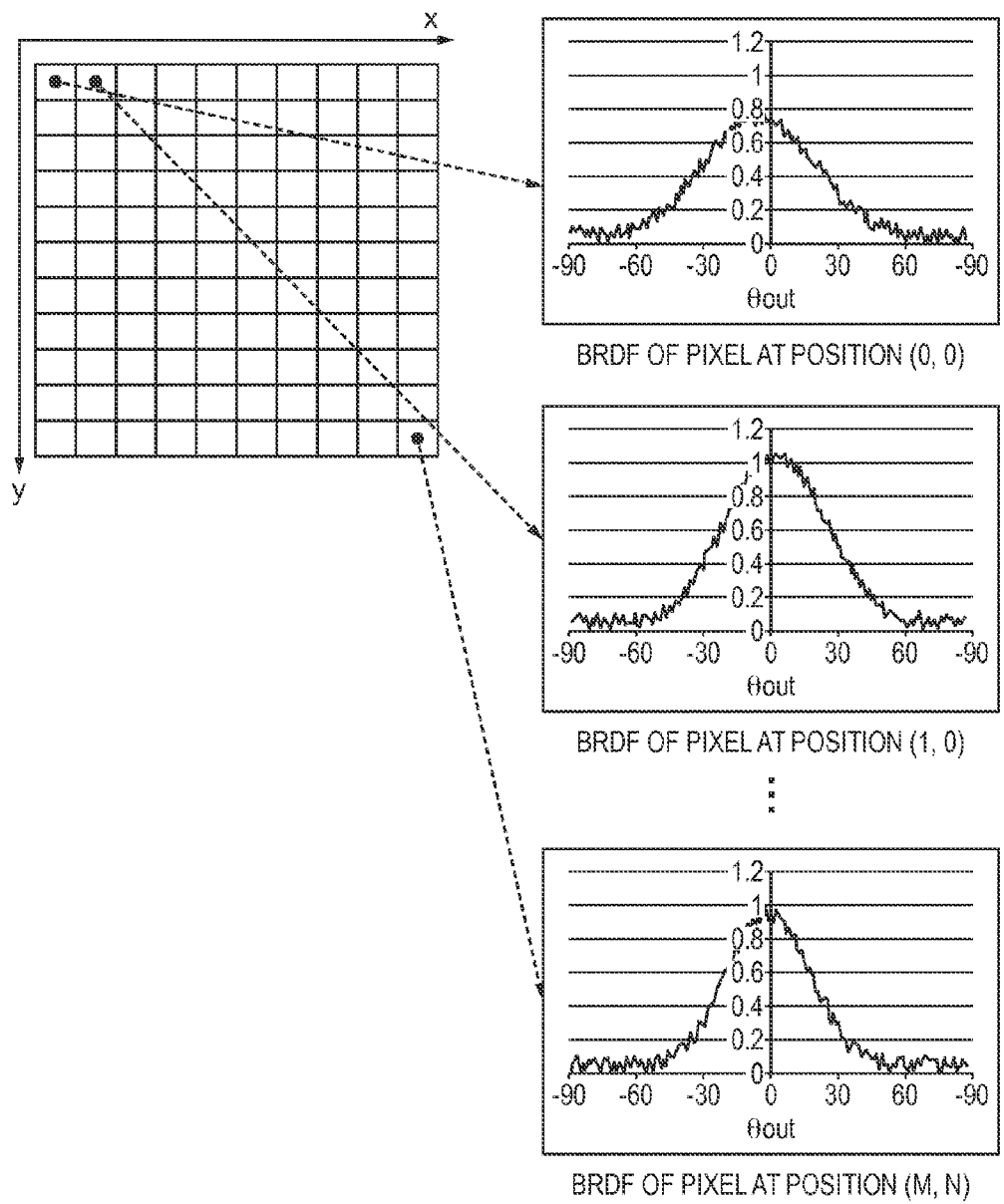
FIG. 3 is a view showing an example of BTF data.
Figure 4:
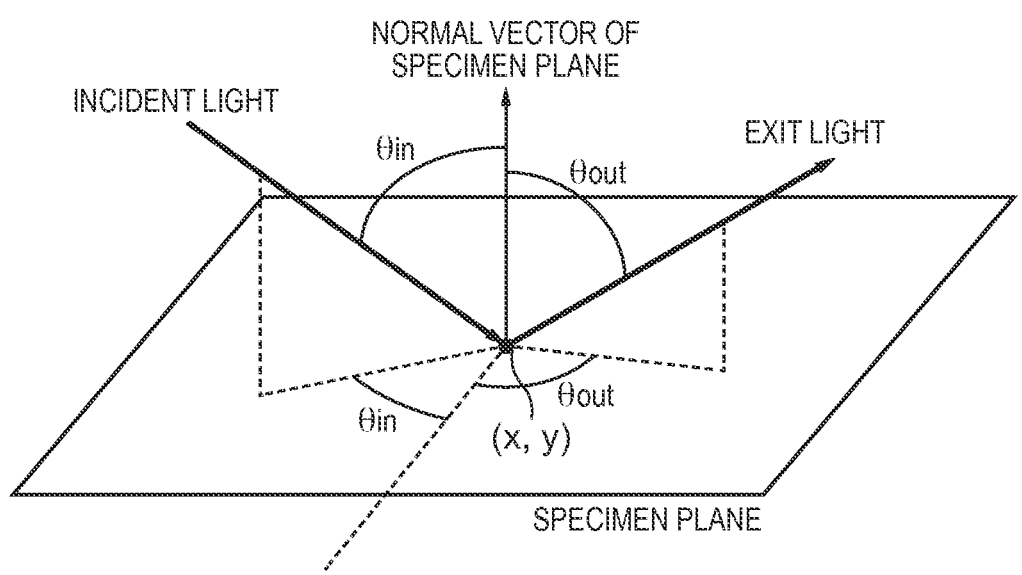
FIG. 4 is a view showing the incident angle and exit angle of reflection characteristics on a specimen plane.

In the first embodiment, assume that an acquired BTF image stores, for each pixel position (x, y), reflectance data for each set of an incident angle ($\theta$in, $\phi$in) and receiving angle ($\theta$out, $\phi$out), as shown in FIG. 3. Note that the incident angle ($\theta$in, $\phi$in) and receiving angle ($\theta$out, $\phi$out) are represented in a geometric form as shown in FIG. 4.

The BRDF of each pixel is represented by a sixth-order function:

$$BRDF(\theta_{in}, \phi_{in}, \theta_{out}, \phi_{out}, x, y) \qquad (1)$$

Consider a case in which the incident angle ($\theta$in, $\phi$in) is fixed and only the receiving angle is changed for a descriptive convenience. If the azimuth (Out) of the receiving angle is fixed to 90°, three variables ($\theta$in, $\phi$in, $\phi$out) of expression (1) are fixed, and expression (1) is simplified to:

$$BRDF(\theta_{out}, x, y) \qquad (2)$$

BRDF data represented by expression (2) is different for each pixel of a region of interest, and a BRDF average value BRDFave ($\theta$out) is calculated by:

$$BRDF_{ave}(\theta_{out}) = \frac{1}{(M+1)\cdot(N+1)} \cdot \sum_{x=0}^{M} \sum_{y=0}^{N} BRDF(\theta_{out}, x, y) \qquad (3)$$

<Calculation of Power Ratio>

A method of calculating the power ratio of the BRDF data of each pixel in step S204 will be described in detail.

The average BRDFave($\theta$out) of the BRDF values of the respective pixels of a target region has been calculated according to equation (3) in step S202. The power ratio of the pixel of interest is calculated as a ratio between the integrated value of the average BFDF data and that of the BRDF data of each pixel when changing the incident and receiving angles, as given by:

$$Power(x, y) = \frac{\sum_{\theta_{out}=0}^{\pi/2} BRDF(\theta_{out}, x, y)}{\sum_{\theta_{out}=0}^{\pi/2} BRDF_{ave}(\theta_{out}, x, y)} \qquad (4)$$

<Calculation of Peak Shift Amount>

A method of calculating the peak shift amount of the BRDF data of each pixel in step S205 will be described in detail.

In the first embodiment, a peak position is calculated by:

$$Peak(x, y) = \frac{\sum_{\theta_{out}=0}^{\pi/2} \{BRDF(\theta_{out}, x, y) \times \theta_{out}\}}{\sum_{\theta_{out}=0}^{\pi/2} BRDF(\theta_{out}, x, y)} \qquad (5)$$

Equation (5) above describes the barycenter of the BRDF data. In the first embodiment, the peak position of the BRDF data is defined and used as the barycenter of the BRDF data. The peak shift amount is calculated as the difference between the barycenter of the BRDF of each pixel of the BTF image data and that of the average BRDF.

As described above, according to the first embodiment, instead of holding the BRDFs of all the pixels after measuring the BTF of the BRDF data of each pixel of a subject, only a power ratio (gain) and angle shift with respect to the average BRDF (macro BRDF) of the designated region represent the BTF data. This enables to reduce (compress) the size of BTF data.

As described above, when acquiring BTF image data as the local BRDF data of a subject, it is possible to acquire a small amount of BTF data (bidirectional texture function data) by only performing gonio image capturing without measuring a surface shape.

Second Embodiment

In the first embodiment, the method of reducing the data amount of the acquired BTF image and storing the data has been explained. In the second embodiment, a method of actually rendering a CG image using stored compressed BTF data will be described.

The arrangement of an image processing apparatus according to the second embodiment will be described with reference to a block diagram shown in FIG. 5.

Reference numeral 501 denotes an image processing apparatus for rendering a CG image using compressed BTF data; 502, a BTF data storage apparatus for storing compressed BTF data; 503, a 3D shape storage apparatus for storing a 3D shape such as polygon data of an object to be rendered; and 504, an illumination data storage apparatus for storing illumination data of a scene to be rendered.

Reference numeral 505 denotes a 3D shape input unit for inputting 3D shape data of the object to the image processing apparatus 501 from the 3D shape storage apparatus 503; 506, an illumination data input unit for inputting illumination data to the image processing apparatus 501 from the illumination data storage apparatus 504; 507, a geometric condition setting unit for setting geometric conditions such as positions of the object and an illumination unit in the scene; and 508, an intersection point calculation unit for calculating the intersection point of a line-of-sight vector and the object based on the geometric conditions set by the geometric condition setting unit 507.

Reference numeral 509 denotes a BTF calculation unit for using the BTF data stored in the BTF data storage apparatus 502 to calculate BTF data at the intersection point calculated by the intersection point calculation unit 508; 510, a brightness calculation unit for calculating the brightness value (brightness data) of the pixel of interest based on the BTF data calculated by the BTF calculation unit 509; 511, an image rendering unit for rendering a CG image (CG image data) based on the brightness data calculated by the brightness calculation unit 510; 512, an image output unit for outputting the CG image data rendered by the image rendering unit 511; 513, an image storage apparatus for storing the CG image data output from the image processing apparatus 501; and 514, an image display apparatus for displaying the CG image data output from the image processing apparatus 501.

Figure 6:
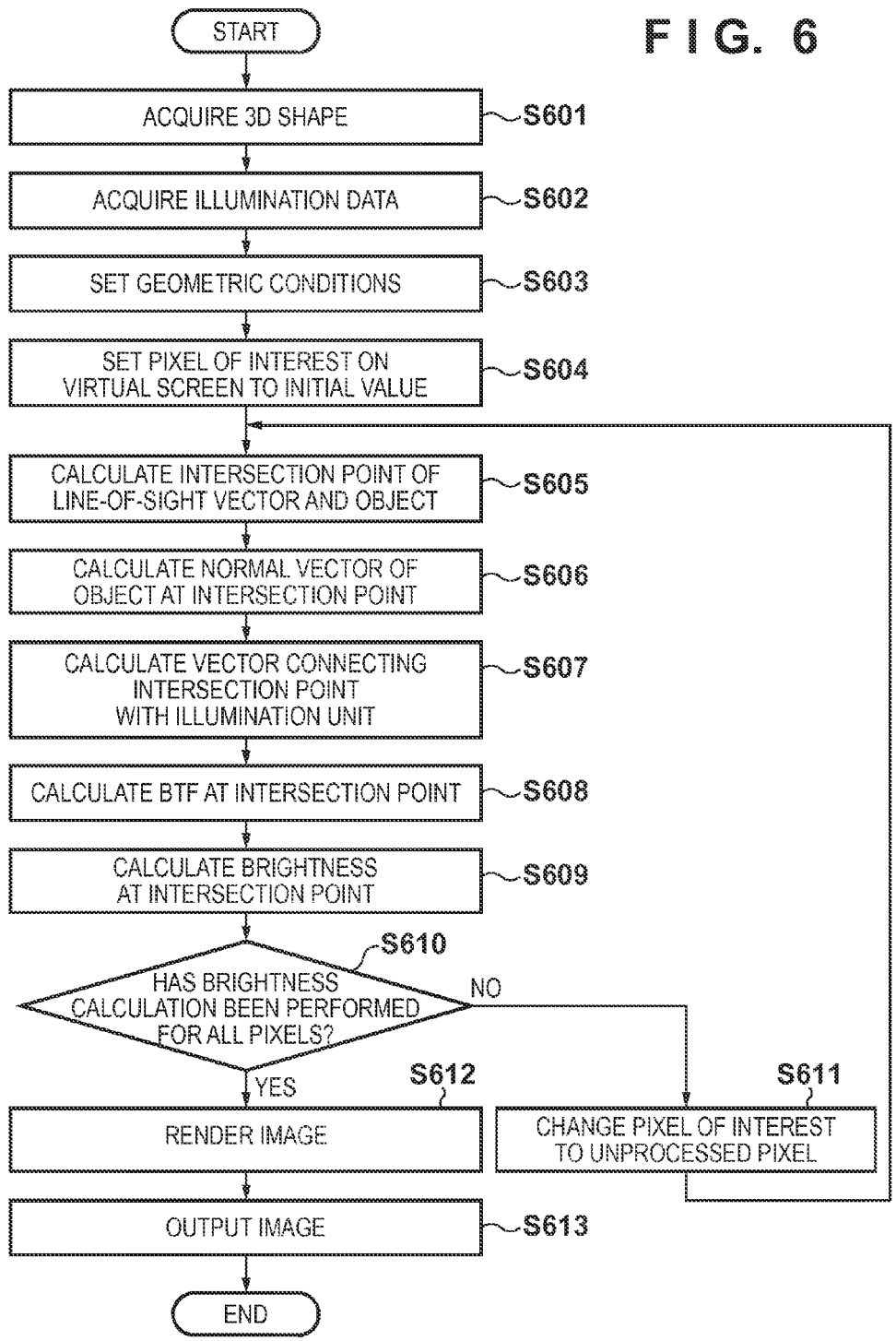
FIG. 6 is a flowchart illustrating processing by the image processing apparatus according to the second embodiment.

FIG. 6 is a flowchart illustrating image processing according to the second embodiment.

In step S601, the 3D shape input unit 505 loads the 3D shape of an object stored in the 3D shape storage apparatus 503 into the image processing apparatus 501. In step S602, the illumination data input unit 506 loads illumination data stored in the illumination data storage apparatus 504 into the image processing apparatus 501. In step S603, the geometric condition setting unit 507 sets geometric conditions for a virtual camera, a virtual screen, an object position, and an illumination unit position. In step S604, a pixel of interest on the virtual screen is set to an initial value (for example, a pixel with X=0 and Y=0).

In step S605, the intersection point calculation unit 508 sets a line connecting the virtual camera with the pixel of interest on the virtual screen as a line-of-sight vector, and calculates the intersection point of the line-of-sight vector and the object. In step S606, the intersection point calculation unit 508 calculates the normal vector of the rendering object at the intersection point calculated in step S605. In step S607, the intersection point calculation unit 508 calculates an illumination vector connecting the intersection point calculated in step S605 and the illumination unit (light source). In step S608, using the BTF data stored in the BTF data storage apparatus 502, the BTF calculation unit 509 calculates the BTF data of the rendering object at the intersection point calculated in step S605 (details thereof will be described later). In step S609, the brightness calculation unit 510 calculates the brightness value of the pixel of interest using the BTF data calculated in step S608, the line-of-sight vector, the normal vector, and the illumination vector.

In step S610, the image processing apparatus 501 determines whether brightness calculation has been performed for all the pixels on the virtual screen. If brightness calculation has not been performed for all the pixels (NO in step S610), the process advances to step S611. In step S611, the image processing apparatus 501 changes the pixel of interest to an unprocessed pixel on the virtual screen, and the process returns to step S605.

On the other hand, if brightness calculation has been performed for all the pixels (YES in step S610), in step S612 the image rendering unit 511 renders CG image data based on the brightness data calculated in step S609. In step S613, the CG image data rendered in step S612 is output from the image output unit 512, and stored in the image storage apparatus 513 or displayed on the image display apparatus 514.

Figure 7A:
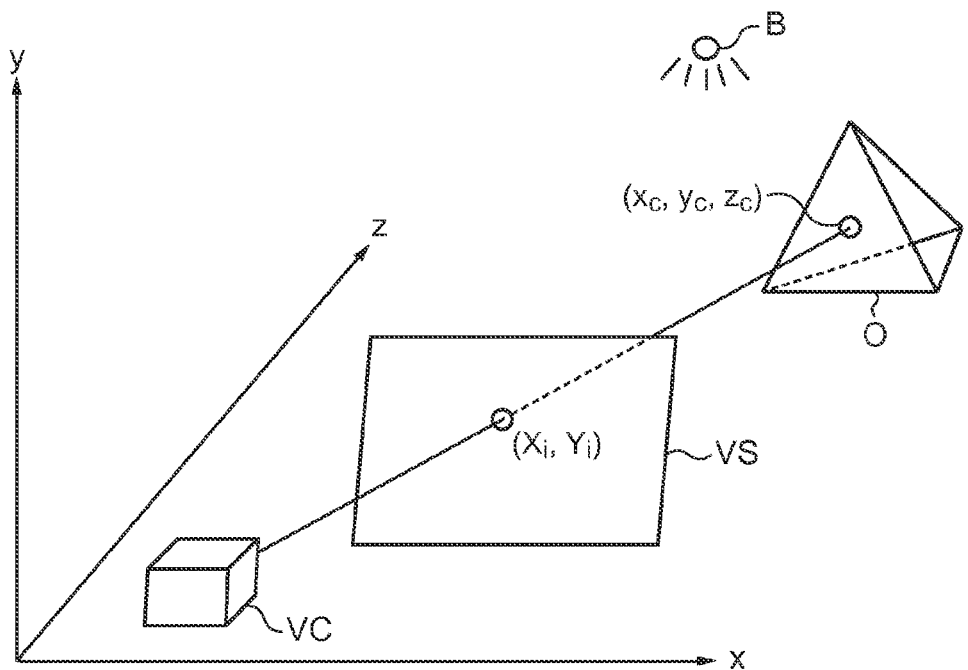
FIG. 7A is a view showing geometric conditions in CG rendering.
Figure 7B:
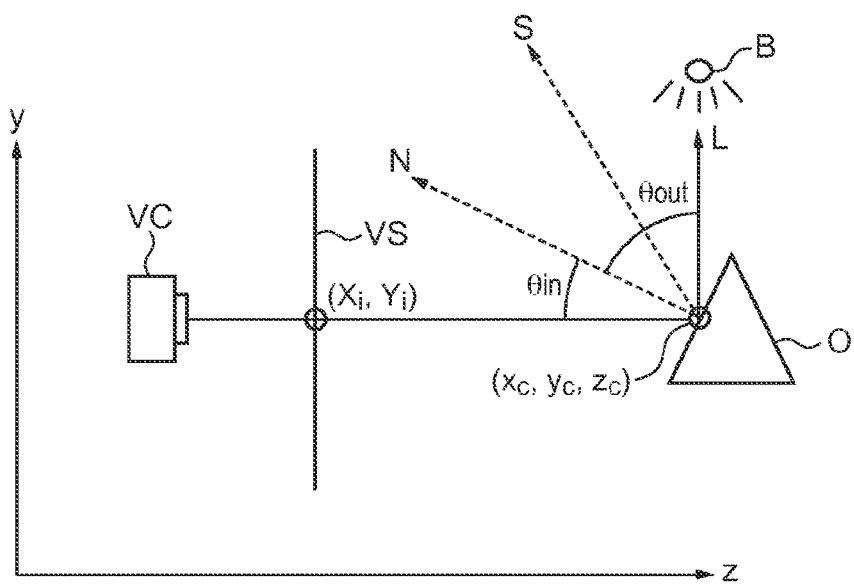
FIG. 7B is a view showing geometric conditions in CG rendering.

Practical examples of the geometric conditions of the above processing will be described with reference to FIGS. 7A and 7B. Specifically, FIG. 7A is a view for explaining geometric conditions in a three-dimensional space (xyz). FIG. 7B is a view showing a y-z plane in the three-dimensional space (xyz).

Referring to FIG. 7A, reference symbol VC denotes a virtual camera; VS, a virtual screen; O, an object; and B, a light source (illumination unit). A position (Xi, Yi) of a pixel of interest is set on the virtual screen VS. With the above-described processing, the intersection point calculation unit 508 sets, as a line-of-sight vector, a straight line connecting the virtual camera VC with the position (Xi, Yi) of the pixel of interest on the virtual screen, and calculates an intersection point (xc, yc, zc) of the line-of-sight vector and the object O. The intersection point calculation unit 508 calculates a normal vector N of the rendering object at the calculated intersection point (xc, yc, zc). The intersection point calculation unit 508 then calculates an illumination vector L connecting the calculated intersection point (xc, yc, zc) with the illumination unit (light source) B. After that, the BTF calculation unit 509 calculates BTF data of the rendering object at the calculated intersection point (xc, yc, zc).

<Calculation of BTF Data>

A method of calculating the BTF data in step S608 will be described.

In the second embodiment, BRDF data is calculated using the BRDF average value BRDFave ($\theta$out) described in the first embodiment, a power ratio Power (x,y) of each pixel, and a peak shift amount Peak (x,Y) of each pixel. That is, the BRDF value BRDF (x, y, θout) at the pixel position (x,y) is calculated by:

$$BRDF(x,y,\theta_{out}) = \text{Power}(x,y) \times BRDF_{ave}\{\theta_{out} + \text{Peak}(x,y)\} \quad (6)$$

As described above, according to the second embodiment, in addition to the effects described in the first embodiment, it is possible to create a CG image at high speed using a decreased amount of BTF data.

According to the present invention, when acquiring bidirectional texture function image data as local average bidirectional reflectance distribution function data of a subject, it is possible to hold a small amount of bidirectional texture function data by only performing gonio image capturing without measuring a surface shape.

Other Embodiments

Note that BTF image data may have a resolution equal to or lower than that of CG image data. If the resolution of BTF image data is lower than that of CG image data, a BRDF is held for each n×m block of the CG image data.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132368, filed Jun. 11, 2012, which is hereby incorporated by reference herein in its entirety.

What is claimed is:

1. An image processing apparatus for rendering a CG image of a target object comprising:
    an input unit configured to input a bidirectional texture function image as a bidirectional reflectance distribution function for each pixel of the target object; and
    a storage control unit configured to store, in a storage apparatus, as information indicating the bidirectional reflectance distribution function for each pixel, an average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data
    wherein the CG image of the target object is rendered using the information indicating the bidirectional reflectance distribution function for each pixel so as to increase rendering efficiency.

2. The apparatus according to claim 1, wherein said storage control unit stores, in the storage apparatus, a ratio to the power of the average bidirectional reflectance distribution function as the power of the bidirectional reflectance distribution function of each pixel of the bidirectional texture function image data.

3. The apparatus according to claim 1, wherein said storage control unit stores, in the storage apparatus, a shift amount from a peak position of the average bidirectional reflectance distribution function as the peak position of each pixel of the bidirectional texture function image data.

4. An image processing apparatus comprising:
    an input unit configured to input, as information indicating a bidirectional texture function image as a bidirectional distribution function for each pixel of a target object, an average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data; and
    an image processing unit configured to execute image processing using the information input by said input unit,
    wherein the image processing unit renders a CG image of the target object using the information indicating the bidirectional texture function as a bidirectional distribution function for each pixel so as to increase rendering efficiency.

5. The apparatus according to claim 4, further comprising a storage control unit configured to store the information input by said input unit in a storage apparatus,
    wherein said storage control unit stores, in the storage apparatus, a ratio to a power of the average bidirectional reflectance distribution function as a power of the bidirectional reflectance distribution function of each pixel of the bidirectional texture function image data.

6. The apparatus according to claim 5, wherein said storage control unit stores, in the storage apparatus, a shift amount from a peak position of the average bidirectional reflectance distribution function as the peak position of each pixel of the bidirectional texture function image data.

7. A control method for an image processing apparatus for rendering a CG image of a target object, comprising:
    an input step of causing an input unit to input a bidirectional texture function image as a bidirectional reflectance distribution function for each pixel of the target object; and
    a storage control step of causing a storage control unit to store, in a storage apparatus, as information indicating the bidirectional reflectance distribution function for each pixel, an average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data wherein the CG image of the target object is rendered using the information indicating the bidirectional reflectance distribution function for each pixel so as to increase rendering efficiency.

8. A control method for an image processing apparatus, comprising:
   an input step of causing an input unit to input, as information indicating a bidirectional texture function image as a bidirectional distribution function for each pixel of a target object, an average bidirectional reflectance distribution function within at least a partial region of the bidirectional texture function image data, a power of bidirectional reflectance distribution function of each pixel of the bidirectional texture function image data, and a peak position of each pixel of the bidirectional texture function image data;
   an image processing step of causing an image processing unit to execute image processing using the information input by the input unit, and
   a rendering step of rendering a CG image of the target object using the information indicating the bidirectional texture function as a bidirectional distribution function for each pixel so as to increase rendering efficiency.

9. A non-transitory computer-readable storage medium storing a program for causing a computer to control an image processing apparatus for rendering a CG image of a target object, the program causing the computer to function as
   an input unit configured to input a bidirectional texture function image as a bidirectional reflectance distribution function for each pixel of the target object, and
   a storage control unit configured to store, in a storage apparatus, as information indicating the bidirectional reflectance distribution function for each pixel, an average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data
   wherein the CG image of the target object is rendered using the information indicating the bidirectional reflectance distribution function for each pixel so as to increase rendering efficiency.

10. A non-transitory computer-readable storage medium storing a program for causing a computer to control an image processing apparatus, the program causing the computer to function as
    an input unit configured to input, as information indicating a bidirectional texture function image as a bidirectional distribution function for each pixel of a target object, an average bidirectional reflectance distribution function within at least a partial region of the bidirectional texture function image data, a power of the bidirectional reflectance distribution function of each pixel of the bidirectional texture function image data, and a peak position of each pixel of the bidirectional texture function image data; and
    an image processing unit configured to execute image processing using the information input by the input unit,
    wherein the image processing unit renders a CG image of the target object using the information indicating the bidirectional texture function as a bidirectional distribution function for each pixel so as to increase rendering efficiency.

* * * * *